Feb. 27, 1962  H. KELLEY  3,023,035
HUB MOUNTING MEANS
Filed Dec. 23, 1959
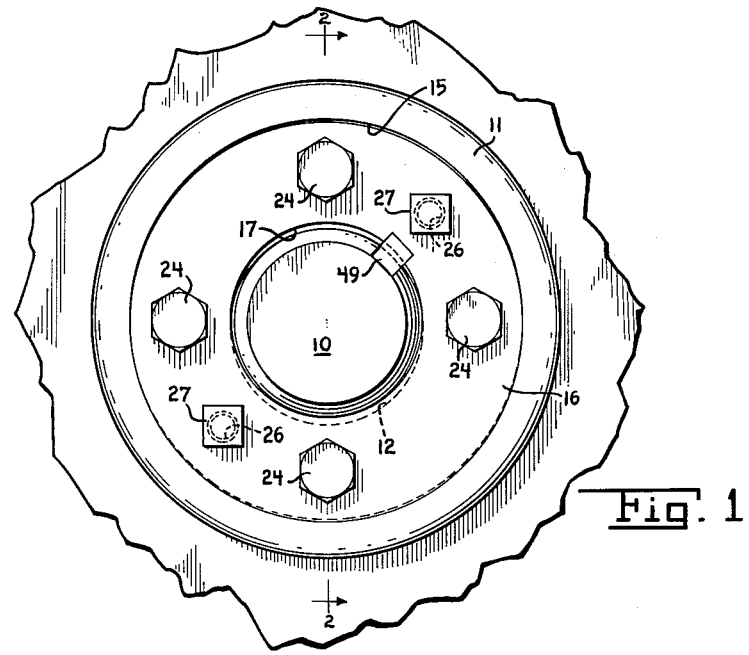
Fig. 1
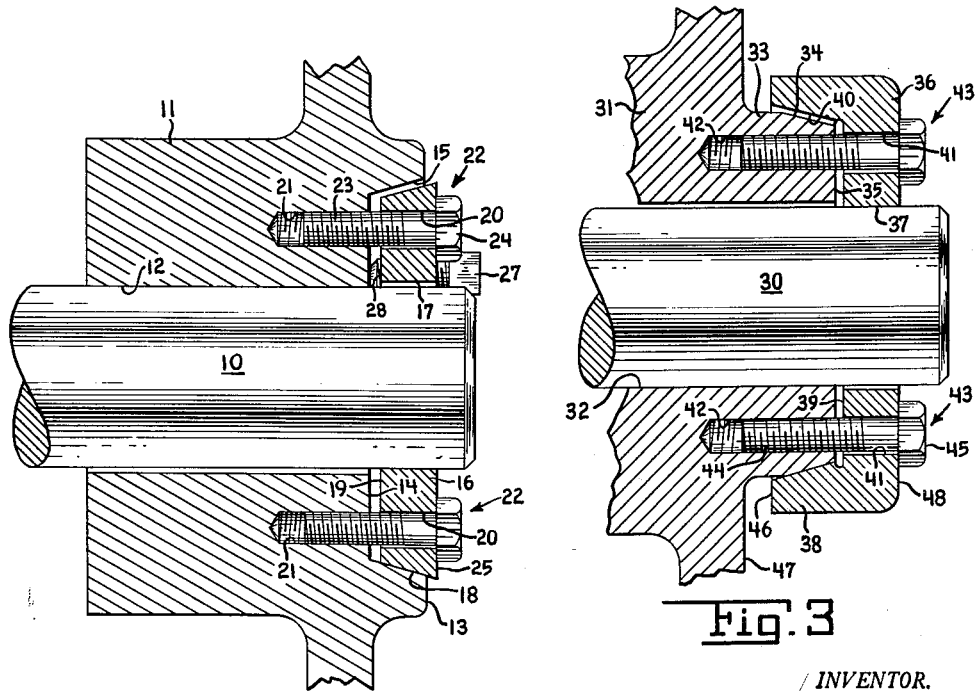
Fig. 2
Fig. 3
INVENTOR.
HUGH KELLEY
BY
Harold B. Hood
ATTORNEY

United States Patent Office 3,023,035
Patented Feb. 27, 1962

3,023,035
HUB MOUNTING MEANS
Hugh Kelley, Enterprise, Kans., assignor to The J. B. Ehrsam & Sons Manufacturing Company, Enterprise, Kans., a corporation of Kansas
Filed Dec. 23, 1959, Ser. No. 861,598
11 Claims. (Cl. 287—52)

The present invention relates to a hub mounting means, and the primary object thereof is to provide means whereby a bored element, such as a pulley, sheave, sprocket, gear, bracket or the like may be secured upon a cylindrical element such as a shaft or rod, with maximum facility, without the use of special tools or attachments, and without the use of set screws or similar devices which, in order fully to accomplish their intended purposes, must necessarily mar the shaft or rod with which they are associated.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 1 is an end elevation of mounting means constructed in accordance with the present invention;

FIG. 2 is a section taken substantially on the line 2—2 of FIG. 1; and

FIG. 3 is a similar section, showing a modified form of mounting means.

Referring more particularly to FIGS. 1 and 2, it will be seen that I have illustrated a fragment of a shaft 10 upon which a peripherally continuous hub 11, having a bore 12, is to be fixedly mounted. According to the present invention, the bore 12 is minutely larger in diameter than the shaft 10 upon which it is to be mounted; and the expression "minutely larger," as used herein and in the appended claims is to be construed to mean larger by from about 0.001" to about 0.025". The critical range, which depends somewhat upon the absolute sizes of the parts, is that within which the hub 11 can be moved radially with respect to the shaft, by the means hereinafter to be described, to an extent great enough to accomplish the intended frictional binding of the hub upon the shaft, but not great enough to create a condition of substantial imbalance in the hub and shaft assembly. Adjacent one end 13 of the hub 11, the bore 12 is enlarged, as shown, to define a socket whose floor comprises an axially-outwardly-facing shoulder 14 which is bounded by an axially-outwardly-flaring, frusto-conical surface 15. The angle of inclination of the surface 15, with respect to the axis of the bore 12, should preferably be greater than 5° and less than 45° and is preferably, as shown, approximately 15°; and said surface 15 is concentric with the bore 12 of the hub 11.

A peripherally-continuous collar 16 is formed with a bore 17 which, like the bore 12, is minutely larger in diameter than the shaft 10 and will preferably be equal in diameter with the bore 12. The external periphery of the collar 16 is formed with a frusto-conical surface 18 tapering to one end 19 of said collar, and said surface 18 is eccentric with respect to the bore 17. The degree of eccentricity of said surface with respect to said bore may be slight and, according to my present belief should preferably be 1/32". The angle of inclination of the surface 18 will preferably be the same as the angle of inclination of the frusto-conical surface 15.

In use, the hub 11 and the collar 16 are sleeved upon the shaft 10 with the end 19 of the collar facing the shoulder 14 of the hub. At a plurality of peripherally spaced points about the axis of the bore 17, the collar is formed with bores 20 adapted to register with a plurality of threaded sockets 21 formed in the hub 11 and opening through the face of the shoulder 14 thereof, said bores and said sockets preferably being arranged on axes substantially parallel with the axis of the shaft 10. A screw, indicated generally by the reference numeral 22, is provided for each bore 20, and the threaded shank 23 of each such screw passes freely through its associated bore 20 and is threadedly received in its associated socket 21. Each such screw is provided with a head 24 larger than the associated bore 20 and arranged for cooperative engagement with the end 25 of the collar 16. It will be apparent that the screw heads 24 are accessible for manipulation and that, when said screw heads are rotated in a direction to cause the screw shanks 23 to penetrate more deeply into their sockets 21, the collar 16 will be drawn toward the shoulder 14, whereby the frusto-conical surface 18 will eccentrically engage the frusto-conical surface 15 and, as the screws are tightened, the surfaces 15 and 18 will cooperate to press a portion of the internal wall of the bore 12 forcibly into frictional engagement with the shaft 10 and to press a diametrically-opposite portion of the internal wall of the bore 17 forcibly into frictional engagement with the shaft 10. Clearance is thus established between the shaft and opposite portions of the internal walls of the bores 12 and 17, as clearly shown in FIG. 2, though it will be appreciated that the degree of such clearance is exaggerated in the drawings for clarity.

It is found, in practice, that through the above described means, the hub 11 may be very effectively secured against axial movement relative to the shaft 10 and that, unless extremely heavy torques are to be transmitted between the hub and the shaft, such means will effectively secure the hub against rotational movement relative to the shaft. It is also found that, when the collar 16 is drawn up to press the surface 18 very heavily against the surface 15 and the assembly is used for any considerable period of time, the adhesion among the parts is so effectively established that, even when the screws 22 are withdrawn, it is sometimes difficult to release the collar 16 from its seat within the hub socket; and therefore I prefer to form the collar, at peripherally spaced points, with a plurality of threaded bores 26 for the reception of presser screws 27 whose shanks 28 penetrate the collar for engagement, at times, with the shoulder 14. It will be perceived that, when the screws 22 have been backed away from the collar 16, manipulation of the screws 27 after their shanks 28 have engaged the surface 14, will force the collar 16 away from the hub 11 to release the engagement of the surfaces 18 and 15, whereafter the collar 16 and the hub 11 may be moved, as desired, relative to the shaft 10.

In FIG. 3, I have illustrated a modified form of hub mounting embodying the present invention. In that figure, a hub 31 is formed with a bore 32 whose diameter is minutely larger than the diameter of the shaft 30 upon which the hub is to be mounted. At one end, the hub is formed with a diametrically-reduced, axial extension 33 which is formed with an external, frusto-conical surface 34 which tapers to the free extremity 35 of said extension. A collar 36 is formed with a bore 37 which is minutely larger in diameter than said shaft 30, and is further formed with an overhanging, peripheral flange 38 which may be construed to define a socket 39 in one end 46 of the collar 36. The flange 38 is interiorly formed with a frusto-conical surface 40 flaring to the collar end 46, said surface 40 being designed to mate with the surface 34 in a manner comparable to the mode of cooperation between the surfaces 15 and 18. The tapered surface 34 is concentric with the bore 32, while the flared surface 40 is eccentric with respect to the bore 37, the degree of such eccentricity being analogous to the degree of eccentricity of the surface 18.

At a plurality of peripherally spaced points about the axis of the bore 37, the collar 36 is formed with bores 41 adapted, when the hub 31 and collar 36 are sleeved on the shaft 30 in the illustrated relationship, to register with a similar plurality of threaded sockets 42 formed in the hub extension 33 and opening through the end 35 thereof. Screws 43 have their shanks 44 arranged to pass freely through the bores 41 and to be threadedly received in the sockets 42; and said screws are provided with heads 45 cooperatively engageable with the opposite end 48 of the collar 36. It will be seen that the screw heads 45 are accessible for manipulation and that, when they are rotated to advance the screw shanks into their sockets 42, the collar 36 will be drawn toward the hub 31 until the surface 40 engages the surface 34 and, through a camming or wedging action presses one portion of the internal wall of the hub bore 32 forcibly into frictional engagement with the shaft 30 and presses a diametrically-opposite portion of the internal wall of the collar bore 37 forcibly into frictional engagement with the shaft 30.

In this form of the invention, it is not necessary to provide means analogous to the screws 27 of FIGS. 1 and 2, since, after backing the screw heads 45 away from the end 48 of the collar 36, prying tools can be inserted between the collar end 46 and the adjacent surface 47 of the hub 31 to force the collar 36 away from the hub, thereby withdrawing the surface 40 from the surface 34 and freeing the hub 31 and the collar 36 for any desired movement relative to the shaft 30.

If desired, the shaft and the hub and/or the collar of either form of the invention may be formed with suitable keyways for the reception of a key 49.

I claim as my invention:

1. The combination with a cylindrical element, of a member having a cylindrical bore minutely larger in diameter than said element, said member being provided, adjacent one end, with a frusto-conical surface concentric with said bore, a collar having a cylindrical bore minutely larger in diameter than said element, said collar being provided with a frusto-conical surface eccentric with respect to the bore of said collar, said member and said collar being sleeved on said element with the frusto-conical surfaces of said member and of said collar in cooperative engagement with each other, and means operatively engaging said member and said collar and manipulable to urge said frusto-conical surfaces axially relative to each other, the recited parts being so constructed and arranged that, upon such manipulation, said frusto-conical surfaces coact to press a portion of the internal wall of said member bore forcibly into frictional engagement with said element and to press a diametrically-opposite portion of the internal wall of said collar bore forcibly into frictional engagement with said element.

2. The combination with a shaft, of a peripherally-continuous hub having a cylindrical bore minutely larger in diameter than said shaft, said hub being provided, adjacent one end, with a frusto-conical surface concentric with said bore, a peripherally-continuous collar having a cylindrical bore minutely larger in diameter than said shaft, said collar being provided with a frusto-conical surface eccentric with respect to the bore of said collar, said hub and said collar being sleeved on said shaft with the frusto-conical surface of said collar in facing relation to the frusto-conical surface of said hub, and means operatively engaging said collar and said hub and manipulable to urge said frusto-conical surfaces axially relative to each other, the recited parts being so constructed and arranged that, upon such manipulation, said frusto-conical surfaces coact to press a portion of the internal wall of said hub bore forcibly into frictional engagement with said shaft and to press a diametrically-opposite portion of the internal wall of said collar bore forcibly into frictional engagement with said shaft.

3. The combination with a shaft, of a hub having a cylindrical bore minutely larger in diameter than said shaft, said bore terminating at one end in a flared, frusto-conical surface concentric with said bore, a collar having a cylindrical bore minutely larger in diameter than said shaft, said collar being provided with an external, frusto-conical surface tapering to one end of said collar and eccentric with respect to said collar bore, said hub and said collar being sleeved on said shaft with said one end of said collar facing said one end of said hub, and a plurality of threaded elements peripherally spaced about the axis of said shaft, arranged on axes parallel with said shaft axis and engaging said hub and said collar, said elements being manipulable to urge said collar and said hub axially toward each other to cause the frusto-conical surface of said collar to enter and engage the frusto-conical surface of said hub with a camming action, the recited parts being so constructed and arranged that such camming action presses a portion of the internal wall of the bore of said hub forcibly into frictional engagement with said shaft and presses a diametrically-opposite portion of the internal wall of the bore of said collar forcibly into frictional engagement with said shaft.

4. The combination of claim 3 including a plurality of screws peripherally spaced about the axis of said shaft upon axes substantially parallel with said shaft axis, each of said screws threadedly penetrating said collar and being projectible beyond said one end of said collar into coactive engagement with said hub.

5. The combination of claim 4 in which each of said threaded elements is a screw having a shank freely penetrating said collar and threadedly engageable in a threaded socket in said hub, and having a head cooperatively engaging the other end of said collar.

6. The combination of claim 3 in which each of said threaded elements is a screw having a shank freely penetrating said collar and threadedly engageable in a threaded socket in said hub, and having a head cooperatively engaging the other end of said collar.

7. The combination with a shaft, of a hub having a cylindrical bore minutely larger in diameter than said shaft, said bore terminating at one end in an enlargement defining an axially-outwardly-facing shoulder externally bounded by a flared, frusto-conical surface concentric with said bore, a collar having a cylindrical bore minutely larger in diameter than said shaft, said collar being provided with an external, frusto-conical surface tapering to one end of said collar and eccentric with respect to said collar bore, said hub and said collar being sleeved on said shaft with said one end of said collar facing said one end of said hub, and a plurality of threaded elements peripherally spaced about the axis of said shaft, arranged on axes parallel with said shaft axis freely penetrating said collar and threadedly engaged in threaded sockets formed in said hub and opening through said shoulder, each of said elements having a head cooperatively engaging the other end of said collar, said heads being accessible for manipulation to urge said collar and said hub axially toward each other to cause the frusto-conical surface of said collar to enter and engage the frusto-conical surface of said hub with a camming action, the recited parts being so constructed and arranged that such camming action presses a portion of the internal wall of the bore of said hub forcibly into frictional engagement with said shaft and presses a diametrically-opposite portion of the internal wall of the bore of said collar forcibly into frictional engagement with said shaft.

8. The combination with a shaft, of a hub having a cylindrical bore minutely larger in diameter than said shaft, said hub being formed, at one end, with an external frusto-conical surface concentric with said bore and tapering toward said end, a collar having a bore minutely larger in diameter than said shaft, said collar being formed, in one end, with a socket bounded by an internal frusto-conical surface eccentric with respect to the bore in said collar and flaring toward said end, said hub and said collar being sleeved on said shaft with said one end of said hub facing said one end of said collar, and a plurality of threaded elements peripherally spaced about the axis of said shaft, arranged on axes parallel with said shaft axis and engaging said hub and said collar, said elements being manipulable to urge said collar and said hub axially toward each other to cause the tapered surface of said hub to enter and engage the flared surface of said collar with a camming action, the recited parts being so constructed and arranged that such camming action presses a portion of the internal wall of the bore of said hub forcibly into frictional engagement with said shaft and presses a diametrically-opposite portion of the internal wall of the bore of said collar forcibly into frictional engagement with said shaft.

9. The combination of claim 8 in which each of said threaded elements is a screw having a shank freely penetrating said collar and threadedly engageable in a threaded socket in said hub, and having a head cooperatively engaging the other end of said collar.

10. The combination with a shaft, of a peripherally-continuous hub having a cylindrical bore minutely larger in diameter than said shaft, said hub being provided, at one end, with a diametrally-reduced, axial extension externally tapered, at its free extremity, to define a frusto-conical surface concentric with said hub bore, a peripherally-continuous collar having a bore minutely larger in diameter than said shaft, said collar being provided, at one end, with an overhanging, peripherally-continuous flange formed to define an internal, flaring, frusto-conical surface eccentric with respect to said collar bore, said hub and said collar being sleeved on said shaft with said one end of said hub facing said one end of said collar, and a plurality of screws peripherally spaced about the axis of said shaft upon axes substantially parallel with said shaft axis, each such screw having a threaded shank freely penetrating said collar and threadedly engageable in a threaded socket in said hub extension, and each such screw having a head cooperatively engaging the other end of said collar, said heads being accessible for manipulation to urge said collar and said hub axially toward each other to cause the tapered surface of said hub extension to enter and engage the flared surface of said collar flange with a camming action, the recited parts being so constructed and arranged that such camming action presses a portion of the internal wall of the bore of said hub forcibly into frictional engagement with said shaft and presses a diametrically-opposite portion of the internal wall of the bore of said collar forcibly into frictional engagement with said shaft.

11. The combination with a cylindrical element, of a member having a cylindrical bore minutely larger in diameter than said element, said member being provided, adjacent one end, with a frusto-conical surface, a collar member having a cylindrical bore minutely larger in diameter than said element, said collar member being provided with a frusto-conical surface, one of said frusto-conical surfaces being concentric with the bore of its member and the other of said frusto-conical surfaces being eccentric with respect to the bore of its member, said members being sleeved on said element with said respective frusto-conical surfaces in cooperative engagement with each other, and means manipulable to urge said frusto-conical surfaces axially relative to each other, the recited parts being so constructed and arranged that, upon such manipulation, said frusto-conical surfaces coact to press a portion of the internal wall of said first-named member bore forcibly into frictional engagement with said element and to press a diametrically-opposite portion of the internal wall of said collar member bore forcibly into frictional engagement with said element.

References Cited in the file of this patent
UNITED STATES PATENTS

| | | |
|---|---|---|
| 486,970 | Hoenscheid | Nov. 29, 1892 |
| 2,273,379 | Searles | Feb. 17, 1942 |